US012779543B2

(12) United States Patent
Eisfeldt

(10) Patent No.: US 12,779,543 B2
(45) Date of Patent: Nov. 3, 2026

(54) ADJACENT TURNING AND MILLING TOOL MOUNT

(71) Applicant: FIVES GIDDINGS & LEWIS, LLC, Fond du Lac, WI (US)

(72) Inventor: Keith A. Eisfeldt, Fond du Lac, WI (US)

(73) Assignee: FIVES GIDDINGS & LEWIS, LLC, Fond du Lac, WI (US)

( * ) Notice: Subject to any disclaimer, the term of this patent is extended or adjusted under 35 U.S.C. 154(b) by 652 days.

(21) Appl. No.: 18/115,326

(22) Filed: Feb. 28, 2023

(65) Prior Publication Data

US 2024/0286199 A1 Aug. 29, 2024

(51) Int. Cl.

| | |
|---|---|
| ***B23C 3/26*** | (2006.01) |
| ***B23B 3/26*** | (2006.01) |
| ***B23C 7/02*** | (2006.01) |
| ***B23Q 3/155*** | (2006.01) |
| ***B23Q 3/157*** | (2006.01) |
| ***B23Q 39/00*** | (2006.01) |
| ***B23Q 39/02*** | (2006.01) |

(52) U.S. Cl.

CPC .................. *B23B 3/26* (2013.01); *B23C 7/02* (2013.01); *B23Q 3/15513* (2013.01); *B23Q 3/15713* (2013.01); *B23Q 2039/008* (2013.01); *B23Q 39/024* (2013.01)

(58) Field of Classification Search

CPC .......... B23B 3/065; B23B 3/162; B23B 3/26; B23B 11/00; B23C 7/02; B23Q 3/15513; B23Q 3/15573; B23Q 3/021; B23Q 3/022; B23Q 3/023; B23Q 3/024; B23Q 2039/002; B23Q 2039/006; B23Q 2039/008; B23Q 1/48; B23Q 1/4828

See application file for complete search history.

(56) References Cited

U.S. PATENT DOCUMENTS

| | | | | | |
|---|---|---|---|---|---|
| 962,474 | A * | 6/1910 | Sherod | B23B 3/065 | 408/23 |
| 1,687,350 | A * | 10/1928 | Rollings | B23Q 1/52 | 409/163 |
| 4,097,175 | A * | 6/1978 | Tsukiji | B23B 39/14 | 409/215 |
| 4,141,134 | A * | 2/1979 | Zettler | B23Q 3/15526 | 483/68 |

(Continued)

FOREIGN PATENT DOCUMENTS

| | | | | |
|---|---|---|---|---|
| CN | 104029087 | A * | 9/2014 | B23Q 1/25 |
| CN | 108568534 | A * | 9/2018 | B23Q 1/62 |

(Continued)

*Primary Examiner* — Jennifer H Gay

(74) *Attorney, Agent, or Firm* — CUSHMAN PARTNERS LLC

(57) ABSTRACT

A mill-turn machine for milling and turning workpieces includes a table configured to hold a workpiece; a tool head, having a workpiece-oriented surface, that is movable to contact the workpiece; a spindle chuck, configured to releasably hold a rotary cutting tool for milling the workpiece, located on the workpiece-facing surface of the tool head; and a turning chuck, configured to releasably hold a stationary cutting tool for turning the workpiece, located on the workpiece-facing surface of the tool head.

15 Claims, 3 Drawing Sheets

(56) References Cited

U.S. PATENT DOCUMENTS

| | | | | | |
|---|---|---|---|---|---|
| RE31,304 | E * | 7/1983 | Tsukiji | B23B 3/065 | 409/215 |
| 4,427,325 | A * | 1/1984 | Kielma | B23Q 5/046 | 409/230 |
| 4,571,813 | A * | 2/1986 | Fukuoka | B23Q 3/15713 | 483/68 |
| 4,602,901 | A * | 7/1986 | Cotta Ramusino | B23Q 3/15713 | 409/203 |
| 4,777,713 | A * | 10/1988 | Kitamura | B23Q 5/045 | 483/22 |
| 5,072,636 | A * | 12/1991 | Gueli | B23Q 39/02 | 82/132 |
| 5,486,151 | A * | 1/1996 | Bergmann | B23Q 3/1574 | 483/1 |
| 6,311,591 | B1 * | 11/2001 | Grossmann | B23Q 39/048 | 82/122 |
| 8,887,361 | B2 * | 11/2014 | Yu | B23B 3/22 | 82/122 |
| 2004/0049902 | A1 * | 3/2004 | Hagstrom | B23Q 1/626 | 29/26 A |
| 2006/0048361 | A1 * | 3/2006 | Corbean | B23Q 39/02 | 409/165 |
| 2010/0210433 | A1 * | 8/2010 | Grossmann | B23Q 3/15713 | 483/66 |
| 2012/0210551 | A1 * | 8/2012 | Yu | B23B 11/00 | 409/212 |
| 2024/0009741 | A1 * | 1/2024 | Ohta | B23Q 39/024 | |
| 2024/0286199 | A1 * | 8/2024 | Eisfeldt | B23Q 3/15513 | |
| 2024/0286237 | A1 * | 8/2024 | Eisfeldt | B23Q 17/248 | |

FOREIGN PATENT DOCUMENTS

| | | | | |
|---|---|---|---|---|
| CN | 116713786 | A * | 9/2023 | B23Q 3/15773 |
| DE | 19910953 | A1 * | 8/2000 | B23Q 1/5406 |
| EP | 1027955 | A2 * | 8/2000 | B23Q 1/5406 |
| JP | S5953138 | A * | 3/1984 | B23Q 3/15713 |
| JP | 2008531321 | A * | 8/2008 | B23Q 1/4861 |
| KR | 20190115216 | A * | 10/2019 | B23Q 3/15534 |
| SU | 1007907 | A1 * | 3/1983 | B23Q 3/15713 |
| WO | WO-2006094712 | A2 * | 9/2006 | B23Q 1/4885 |
| WO | WO-2024190016 | A1 * | 9/2024 | B23P 23/02 |

* cited by examiner

ADJACENT TURNING AND MILLING TOOL MOUNT

TECHNICAL FIELD

The present application relates to machine tools and, more particularly, to mill-turn machines.

BACKGROUND

Machine tools are used to cut a wide variety of different workpieces. Depending on the type of machining used to form a workpiece, different types of machine tools may be used on one workpiece. For example, milling machines include rotating spindles coupled with a rotary cutting tool used to cut and bore stationary workpieces. And turning machines include a stationary cutting tool applied to a rotating workpiece. However, as efficiency demands increase, these different cutting techniques have been combined and offered using a common machine tool, often referred to as a mill-turn machine. The use of each type of cutting tool involves different loads and mechanics and the configuration of a mill-turn machine that uses both types of tools can be challenging. For instance, as the size of machines increase, combining their functionality can be increasingly challenging as well.

SUMMARY

In one implementation, a mill-turn machine for milling and turning workpieces includes a table configured to hold a workpiece; a tool head, having a workpiece-oriented surface, that is movable to contact the workpiece; a spindle chuck, configured to releasably hold a rotary cutting tool for milling the workpiece, located on the workpiece-oriented surface of the tool head; and a turning chuck, configured to releasably hold a stationary cutting tool for turning the workpiece, located on the workpiece-oriented surface of the tool head.

In another implementation, a mill-turn machine for milling and turning workpieces includes a tool head that is movable to contact the workpiece; a spindle chuck, configured to releasably hold a rotary cutting tool for milling the workpiece, located on an outer surface of the tool head; and a turning chuck, configured to releasably hold a stationary cutting tool for turning the workpiece, located on the outer surface of the tool head.

DETAILED DESCRIPTION

A mill-turn machine, capable of both milling and turning machining operations, includes a tool head having a spindle chuck for releasably holding a rotary cutting tool for milling operations as well as a turning chuck for releasably holding a stationary cutting tool for turning operations. The spindle chuck and the turning chuck, as well as the rotary cutting tool and stationary cutting tool, can both be located near each other on a workpiece-oriented surface of the tool head. That way the tool head can be positioned in proximity to the workpiece along with either the rotary cutting tool and the stationary cutting tool, such that the spindle can be dedicated to milling and the stationary cutting tool can be dedicated to turning. An automatic tool changer can be positioned adjacent the tool head so that the rotary cutting tool and/or the stationary cutting tool each held by the tool head can be replaced.

Past implementations of mill-turn machines may use spindles that hold stationary cutting tools for turning operations. However, such a design often increases the load on spindle bearings and is subject to vibration, which displaces lubricant increasing the likelihood of fretting. The increased loads can be accommodated with use of a Hirth or Curvic coupling to isolate cutting loads from spindle bearings. However, these couplings can be complex and costly. Apart from coupling complexity, implementing a mill-turn machine with a spindle that holds a stationary cutting tool for turning operations may involve a configuration that axially displaces the spindle to accommodate the coupling, increasing machine complexity, and reducing machine stiffness.

Other past designs have included separate machine structures each dedicated to rotary cutting tools or stationary cutting tools. But having separate structures for each cutting tool may be less feasible as the size of the mill-turn machine, along with machining loads, increases. Also, separate machine structures can increase cost.

Some past mill-turn machines have used different removable adapters coupled to a tool head, depending on whether rotating cutting tools or stationary cutting tools are used. However, the addition of an adapter to a mill-turn machine also necessitates provisions for storing the adapter as well as adding cycle time to add and remove the adapter.

Figure 1:
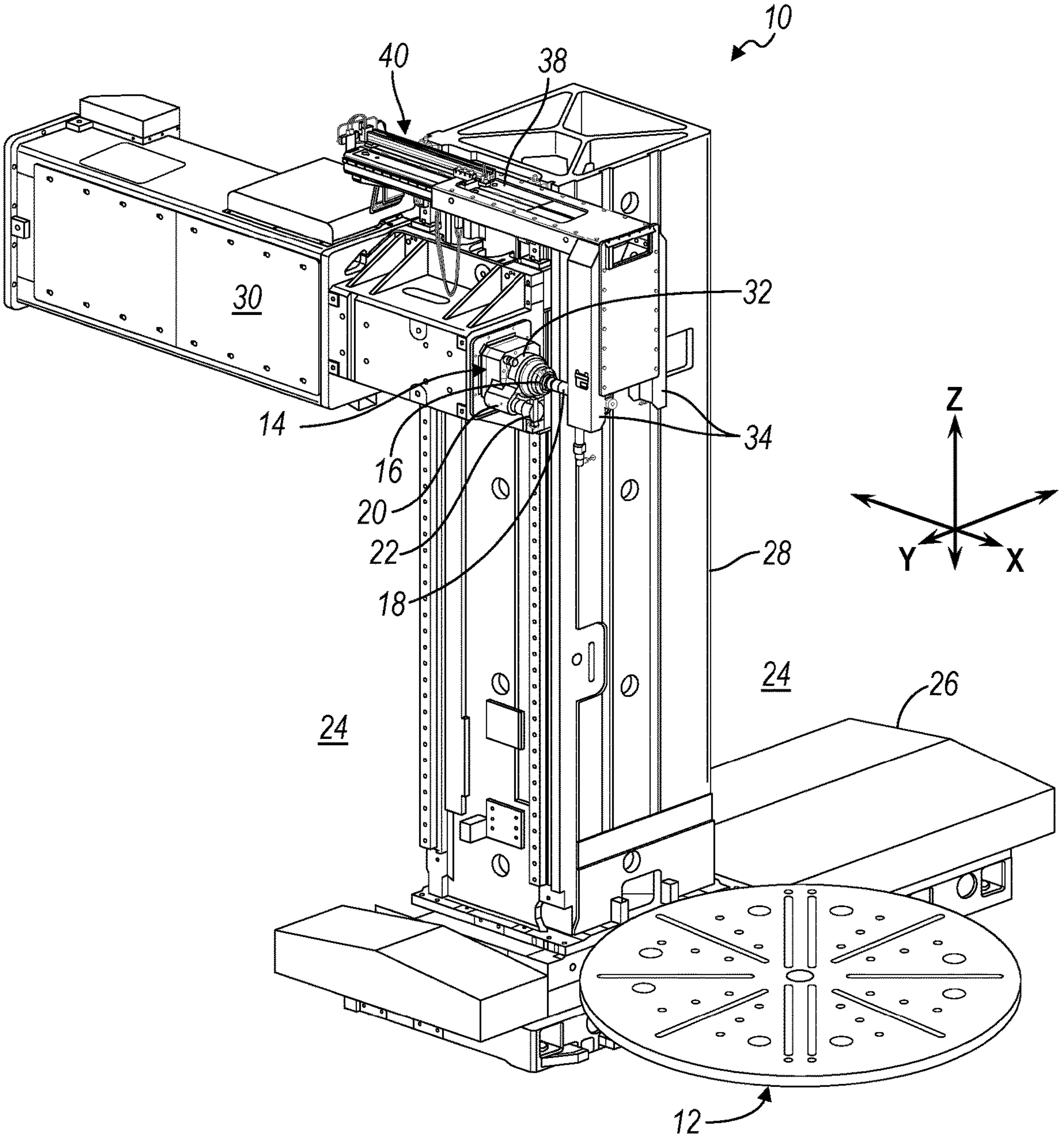
FIG. 1 is a perspective view depicting an implementation of a mill-turn machine.
Figure 2:
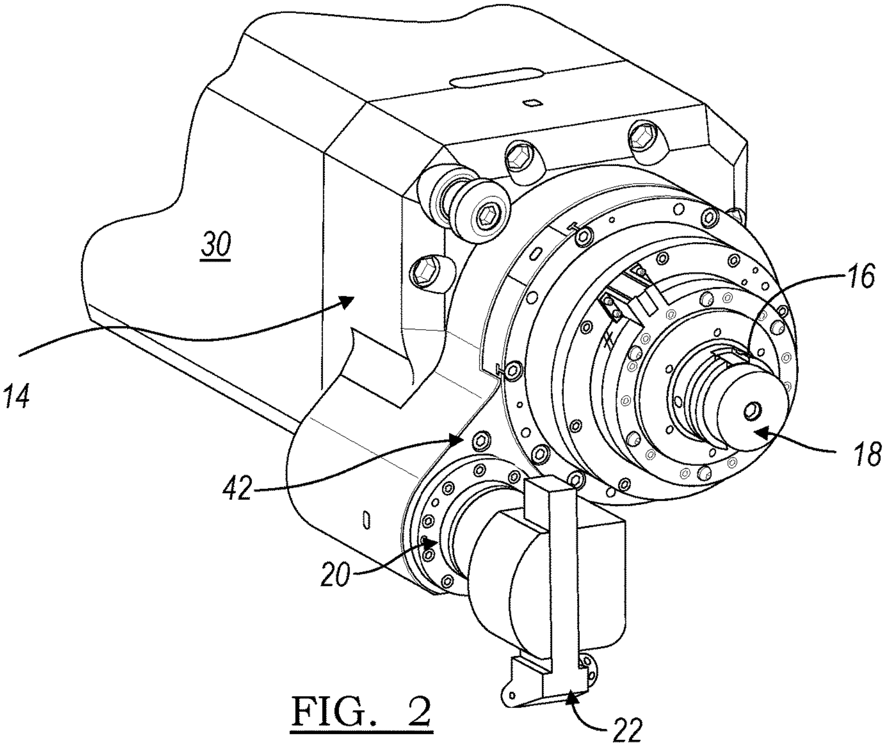
FIG. 2 is a perspective view depicting a portion of an implementation of a mill-turn machine.
Figure 3:
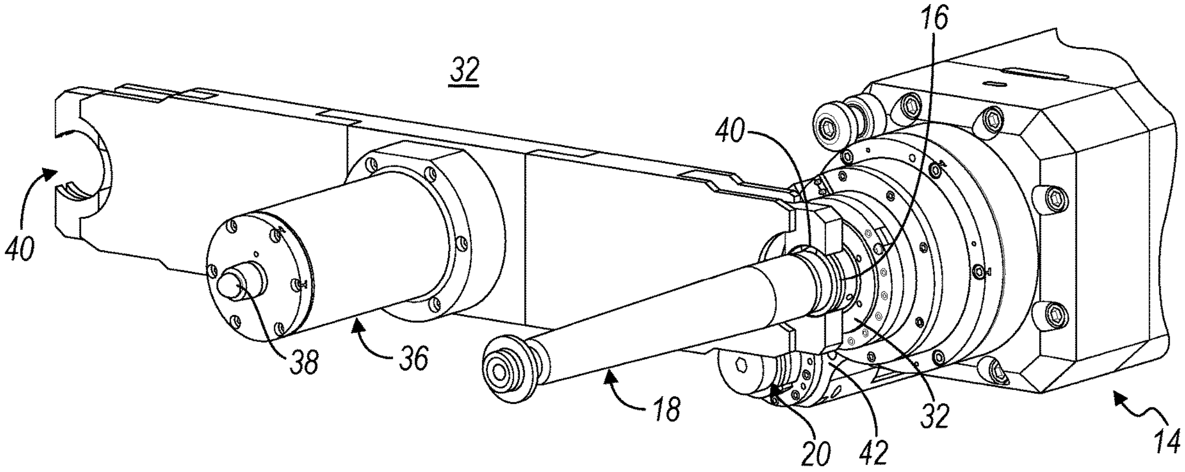
FIG. 3 is a perspective view depicting a portion of an implementation of a mill-turn machine.
Figure 4:
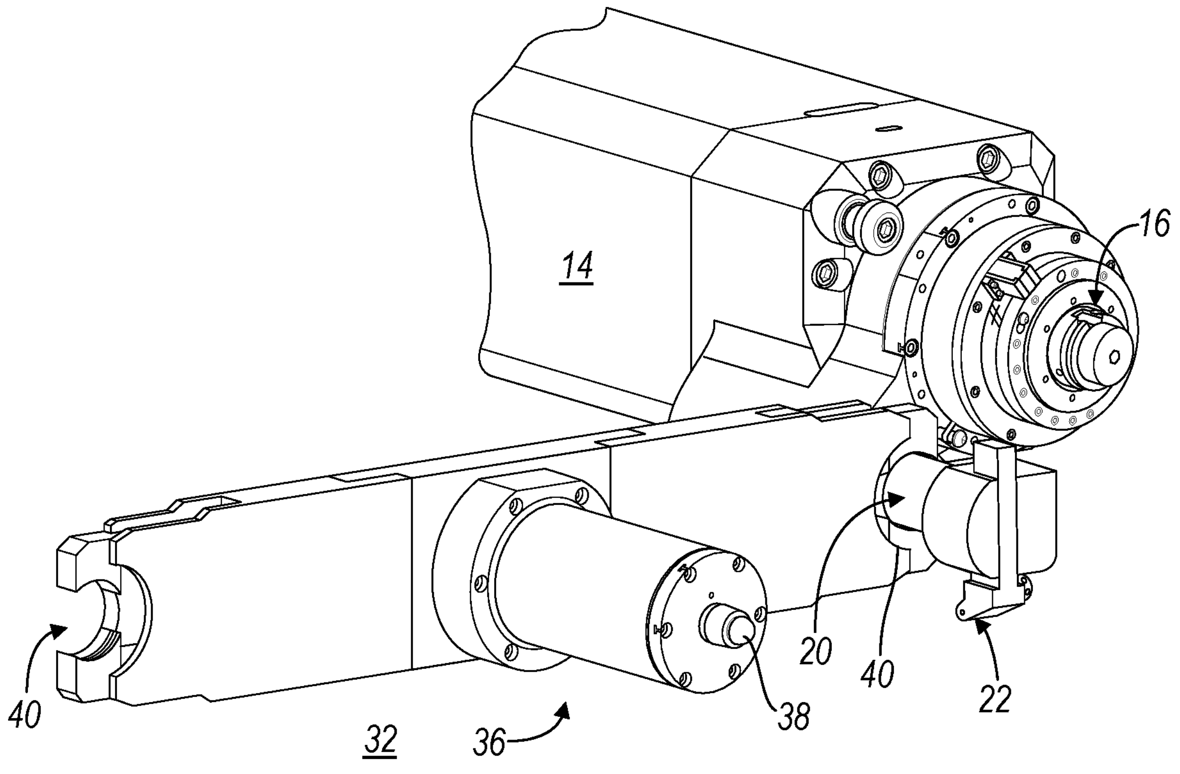
FIG. 4 is a perspective view depicting a portion of an implementation of a mill-turn machine.

Turning to FIGS. 1-4, an implementation of a mill-turn machine 10 is shown. The mill-turn machine 10 includes a table 12, for securely holding a workpiece, and a tool head 14. The tool head 14 includes both a spindle chuck 16 that can releasably hold a rotary cutting tool 18 and a turning chuck 20 that can releasably hold a stationary cutting tool 22, used to remove material from workpieces. The spindle chuck 16 can be coupled to a spindle 32 that rotates the rotary cutting tool 18 during milling operations. The mill-turn machine 10 can articulate the tool head 14 within the workspace 24 relative to the workpiece depending on the desired shape of the workpiece and the machining to be carried out. The mill-turn machine 10 can include a base 26 on which a column 28 is slidably attached to move in a y-direction. A ram 30 can be slidably attached to the column 28 via a carriage that moves along a z-direction and can move the tool head 14 in an x-direction. The tool head 16 can be coupled with a distal end of the ram 30. The ram 14 can slidably actuate and position the tool 32 so that it can carry out different machining functions, such as vertical turning operations or horizontal milling operations. The tool head 14 can be slidably attached to the column 28 and move the work head in a x-direction. The machine 10 can include the stationary cutting tool 22 having a cutting edge used for turning the workpiece using the table 12 that rotates the workpiece. Examples of stationary cutting tools include turning tools, chamfering tools, or boring bars. The spindle 32 can rotate the rotary cutting tool 18 for milling the workpiece while it is held on the table 12. Both the rotary cutting tool 18 and the stationary cutting tool 22 can be releasably held by the tool head 14 using the spindle chuck 16 and the turning chuck 20, respectively, that close to hold the cutting tools and open to release the tools.

The machine 10 can include an automatic tool changer 32 that, in coordination with the chucks 16, 20 releasably holding the cutting tools 18, 22, can replace the rotary cutting tool 18 or stationary cutting tool 22 held by the tool head 14 automatically without manual user assistance. Different implementations of automatic tool changers are possible. However, in one implementation, the automatic tool changer 32 includes an exchange arm 36 that rotates about a shaft 38 selectively bringing a distal end of the arm 36 into close proximity to the end of the tool head 14. One or more tool receptacles 40 formed in the loading arm 36 can each releasably hold a rotary cutting tool 18 or a stationary cutting tool 22. For example, the tool receptacles 40 can include one or more movable fingers that can releasably hold a cutting tool at the receptacle 40. A nearby tool magazine (not shown) can store a variety of cutting tools of which one can be selected and offered to the loading arm 36. The arm 36 can rotate to place the tool receptacle 40 in a position so that the receptacle 40 can grab a cutting tool, after which the tool arm 36 can rotate to place the receptacle 40 and cutting tool into close proximity to the tool head 14. The tool head 14 can be moved so that the spindle chuck 16 (if the receptacle 40 holds the rotary cutting tool 18) or the turning chuck 20 (if the receptacle 40 holds the stationary cutting tool 22) can close and hold the cutting tool. The tool receptacle 40 can release the cutting tool and the loading arm 36 can rotate about the shaft 38 so the receptacle 40 is away from the tool head 14 and out of the workspace 24. A similar process can be used to remove a cutting tool from either chuck.

The tool head 14 includes a workpiece-oriented surface 42 where the spindle chuck 16 and the turning chuck 20 are both located in close proximity to each other thereby isolating the rotary cutting tool 18 and stationary cutting tool 22. The location of the spindle chuck 16 and the turning chuck 20 on the workpiece-oriented surface 42 can be spaced such that the tool arm 36 and receptacle 40 can access either the rotary cutting tool 18 or the stationary cutting tool 22 for removal and/or replacement. The tool head 14 can be articulated by the machine 10 such that the rotary cutting tool 18 can engage a workpiece for milling operations and the stationary cutting tool 22 can engage the workpiece for turning operations.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A mill-turn machine for milling and turning workpieces, comprising:
- a ram;
- a rotary table configured to support and securely hold a workpiece and to rotate the workpiece during vertical turning operations;
- a tool head, having a workpiece-oriented surface, that is movable to contact the workpiece, the tool head being coupled to the ram;
- a spindle chuck, configured to releasably hold a rotary cutting tool for milling the workpiece and coupled to a spindle configured to rotate the rotary cutting tool, the spindle chuck located on the workpiece-oriented surface of the tool head; and
- a turning chuck, separate from the spindle chuck, configured to releasably hold a stationary cutting tool for turning the workpiece, the turning chuck configured to close to hold the stationary cutting tool and to open to release the stationary cutting tool, the turning chuck located on the workpiece-oriented surface of the tool head; and
- wherein, during the vertical turning operations, the stationary cutting tool is configured to turn the workpiece while the rotary table rotates the workpiece.

2. The mill-turn machine recited in claim 1, further comprising an automatic tool changer configured to access both the rotary cutting tool and the stationary cutting tool for removal or replacement.

3. The mill-turn machine recited in claim 2, wherein the automatic tool changer includes a loading arm that rotates about a shaft.

4. The mill-turn machine recited in claim 1, further comprising a column, supported by a base, having said ram that moves the tool head into contact with the workpiece.

5. The mill-turn machine recited in claim 1, wherein the ram is a slidable ram.

6. The mill-turn machine recited in claim 1, wherein the rotary table comprises a surface for holding the workpiece and rotates about a vertical axis extending in a z-direction, wherein the spindle chuck rotates the rotary cutting tool about a spindle axis extending in an x-direction that is perpendicular to the vertical axis, and wherein the turning chuck turns about an axis parallel to the spindle axis.

7. The mill-turn machine recited in claim 6, further comprising a column attached to a base and wherein said ram moves along the column in the z-direction and moves the tool head in the x-direction into contact with the workpiece.

8. The mill-turn machine recited in claim 6, further comprising a column extending in the z-direction, wherein the tool head is slidably attached to the column to move in the z-direction and wherein the tool head moves in the x-direction to contact the workpiece.

9. A mill-turn machine for milling and turning workpieces, comprising:
- a ram;
- a tool head that is movable to contact the workpiece, the tool head being coupled to the ram;
- a spindle chuck, configured to releasably hold a rotary cutting tool for milling the workpiece and coupled to a spindle configured to rotate the rotary cutting tool, the spindle chuck located on an outer surface of the tool head; and a turning chuck, separate from the spindle chuck, configured to releasably hold a stationary cutting tool for turning the workpiece, the turning chuck configured to close to hold the stationary cutting tool and to open to release the stationary cutting tool, the turning chuck located on the outer surface of the tool head, wherein the stationary cutting tool is configured to engage the workpiece for turning operations while the workpiece is rotated.

10. The mill-turn machine recited in claim 9, further comprising an automatic tool changer configured to access both the rotary cutting tool and the stationary cutting tool for removal or replacement.

11. The mill-turn machine recited in claim 10, wherein the automatic tool changer includes a loading arm that rotates about a shaft.

12. The mill-turn machine recited in claim 9, further comprising a column, supported by a base, having said ram that moves the tool head into contact with the workpiece.

13. The mill-turn machine recited in claim 9, further comprising a table having a surface for rotating the workpiece about a vertical axis, wherein the spindle chuck rotates the rotary cutting tool about a spindle axis that is perpendicular to the vertical axis, and wherein the turning chuck turns about an axis parallel to the spindle axis.

14. The mill-turn machine recited in claim 13, further comprising a column attached to a base and wherein said ram moves along the column in a vertical direction relative to the vertical axis and moves the tool head in a direction perpendicular to the vertical axis into contact with the workpiece.

15. The mill-turn machine recited in claim 13, further comprising a column extending in a vertical direction, wherein the tool head is slidably attached to the column to move in the vertical direction and wherein the tool head moves in a direction perpendicular to the vertical direction to contact the workpiece.

* * * * *